(12) United States Patent
Chen et al.

(10) Patent No.: US 12,512,843 B2
(45) Date of Patent: Dec. 30, 2025

(54) DYNAMIC CONFIGURATION OF AN OSCILLATOR USING ADAPTIVE VOLTAGE AND CODE SCALING TO FOLLOW A TARGET FREQUENCY

(71) Applicant: MediaTek Inc., Hsinchu (TW)

(72) Inventors: Yu-Shu Chen, Hsinchu (TW); Hsin-Chen Chen, San Jose, CA (US); Kuan Hung Lin, Hsinchu (TW); Jeng-Yi Lin, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 149 days.

(21) Appl. No.: 18/490,728

(22) Filed: Oct. 19, 2023

(65) Prior Publication Data

US 2024/0146316 A1 May 2, 2024

Related U.S. Application Data

(60) Provisional application No. 63/381,310, filed on Oct. 28, 2022.

(51) Int. Cl.
| | |
|---|---|
| *H03L 7/099* | (2006.01) |
| *G06F 1/20* | (2006.01) |
| *G06F 1/26* | (2006.01) |
| *G06F 1/28* | (2006.01) |
| *G06F 1/3215* | (2019.01) |
| *G06F 1/324* | (2019.01) |
| *G06F 1/3296* | (2019.01) |

(52) U.S. Cl.
CPC ............ *H03L 7/0991* (2013.01); *G06F 1/324* (2013.01); *H03L 7/0995* (2013.01); *H03L 2207/50* (2013.01)

(58) Field of Classification Search
CPC ...... H03L 7/0991; H03L 7/0995; G06F 1/324
See application file for complete search history.

(56) References Cited

U.S. PATENT DOCUMENTS

| | | | | |
|---|---|---|---|---|
| 2007/0229054 | A1* | 10/2007 | Dobberpuhl | G01R 31/2879 324/76.11 |
| 2013/0249611 | A1* | 9/2013 | Vandepas | H03L 7/0802 327/159 |
| 2018/0232033 | A1* | 8/2018 | Gu | G06F 1/324 |
| 2019/0296747 | A1* | 9/2019 | Mosalikanti | H03L 7/093 |
| 2021/0055921 | A1 | 2/2021 | Sebot et al. | |
| 2021/0294373 | A1 | 9/2021 | Toosizadeh et al. | |

OTHER PUBLICATIONS

The Extended European Search Report, Application No. 23206211, mailed Mar. 15, 2024.

\* cited by examiner

*Primary Examiner* — Jaweed A Abbaszadeh
*Assistant Examiner* — Gayathri Sampath
(74) *Attorney, Agent, or Firm* — Tong J. Lee (57) ABSTRACT

A system performs a method of adaptive voltage scaling. The method includes generating a voltage adjustment signal based on a hint from a frequency-locked loop (FLL). The FLL includes an oscillator that generates a clock signal at a clock frequency. The voltage adjustment signal is sent to a power management unit (PMU) to cause the PMU to supply an adjusted operating voltage to the FLL. The method further includes updating a minimum code set according to the adjusted operating voltage and an operating temperature. The clock frequency of the oscillator is generated to match a target frequency according to the adjusted operating voltage and a code determined by the FLL from the minimum code set.

18 Claims, 5 Drawing Sheets

| Voltage | CC=0 MinCode | CC=1 MinCode | CC=2 MinCode | CC=3 MinCode |
|---|---|---|---|---|
| 400 | 12 | 27 | 39 | 46 |
| 500 | 4 | 19 | 31 | 38 |
| 800 | 8 | 23 | 35 | 42 |
| 900 | 10 | 25 | 37 | 44 |

DYNAMIC CONFIGURATION OF AN OSCILLATOR USING ADAPTIVE VOLTAGE AND CODE SCALING TO FOLLOW A TARGET FREQUENCY

CROSS-REFERENCE TO RELATED APPLICATIONS

This application claims the benefit of U.S. Provisional Application No. 63/381,310 filed on Oct. 28, 2022, the entirety of which is incorporated by reference herein.

TECHNICAL FIELD

Embodiments of the invention relate to dynamic voltage scaling software and hardware in a computing system.

BACKGROUND OF THE INVENTION

Modern processors use dynamic techniques, such as dynamic voltage and frequency scaling (DVFS), to balance performance and power consumption to meet workload demands. When a processor is under a heavy workload, the operating voltage and frequency can be increased to achieve a higher performance. Conversely, when the workload is light, the operating voltage and frequency can be decreased to save power and reduce heat generation. When the operating frequency increases, a processor requires a higher operating voltage to perform its operations and maintain the stability. However, increasing the operating voltage can cause a significant increase in power consumption and heat generation, which not only can adversely degrade the system performance but can also damage the processor hardware.

Manufacturers often design processors to operate within specific voltage and frequency ranges to maintain a balance between performance, power consumption, and reliability. The relationship between an operating frequency and its corresponding voltage can be described by a voltage-frequency curve used by the DVFS. Manufacturers typically build in a large voltage margin in the curve to ensure proper operations of the processors at the expense of energy efficiency. Additionally, physical parameters and characteristics of processor chips can vary widely due to variations in the fabrication process, and can change over time due to aging and changes in operating conditions (e.g., temperature, current, etc.). Conventional DVFS techniques do not sufficiently address these changes. Thus, there is a need for improving the voltage scaling techniques in a processor system.

SUMMARY OF THE INVENTION

In one embodiment, a method is provided for adaptive voltage scaling. The method includes the step of generating a voltage adjustment signal based on a hint from a frequency-locked loop (FLL). The FLL includes an oscillator that generates a clock signal at a clock frequency. The method further includes the steps of sending the voltage adjustment signal to a power management unit (PMU) to cause the PMU to supply an adjusted operating voltage to the FLL, and updating a minimum code set according to the adjusted operating voltage and an operating temperature. The clock frequency of the oscillator is generated to match a target frequency according to the adjusted operating voltage and a code determined by the FLL from the minimum code set.

In another embodiment, a system is operative to perform adaptive voltage scaling. The system includes an FLL circuit, which further includes an oscillator. The oscillator is operative to generate a clock signal at a clock frequency. The system further includes a circuit operative to control dynamic voltage and code scaling (DVCS). The circuit is further operative to a voltage adjustment signal based on a hint from the FLL, send the voltage adjustment signal to a PMU to cause the PMU to supply an adjusted operating voltage to the FLL, and update a minimum code set according to the adjusted operating voltage and an operating temperature. The clock frequency of the oscillator is generated to match a target frequency according to the adjusted operating voltage and a code determined by the FLL from the minimum code set.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

This disclosure describes an adaptive voltage and code scaling (DVCS) mechanism that enables a computing system to maintain a required computing power and achieve optimal energy efficiency. The DVCS mechanism tracks the computing power required by a computing system in real time and optimizes the power output in real time. The DVCS mechanism can respond to a wide range of physical transients that occur inside a processor chip.

The computing power required by a computing system depends on system workload, and can be distorted by changes in physical parameters and characteristics of the chip on which the system resides. These changes often have no feedback mechanism to the system. According to embodiments of the invention, a frequency-locked loop (FLL) controller monitors changes in physical parameters and/or operating conditions and immediately feeds back to a DVCS controller to perform voltage correction. The FLL feedback and the DVCS operations enable a computing system to save power and achieve an optimal power output.

In one embodiment, a computing system may utilize both DVFS and DVCS for adaptive voltage control. The computing system may include both a DVFS controller and a DVCS controller. The DVFS controller determines whether to change the operating frequency and the corresponding operating voltage to satisfy the system performance under a given workload. The DVCS controller determines whether to apply fine adjustments to the operating voltage for a given target frequency.

Figure 1:
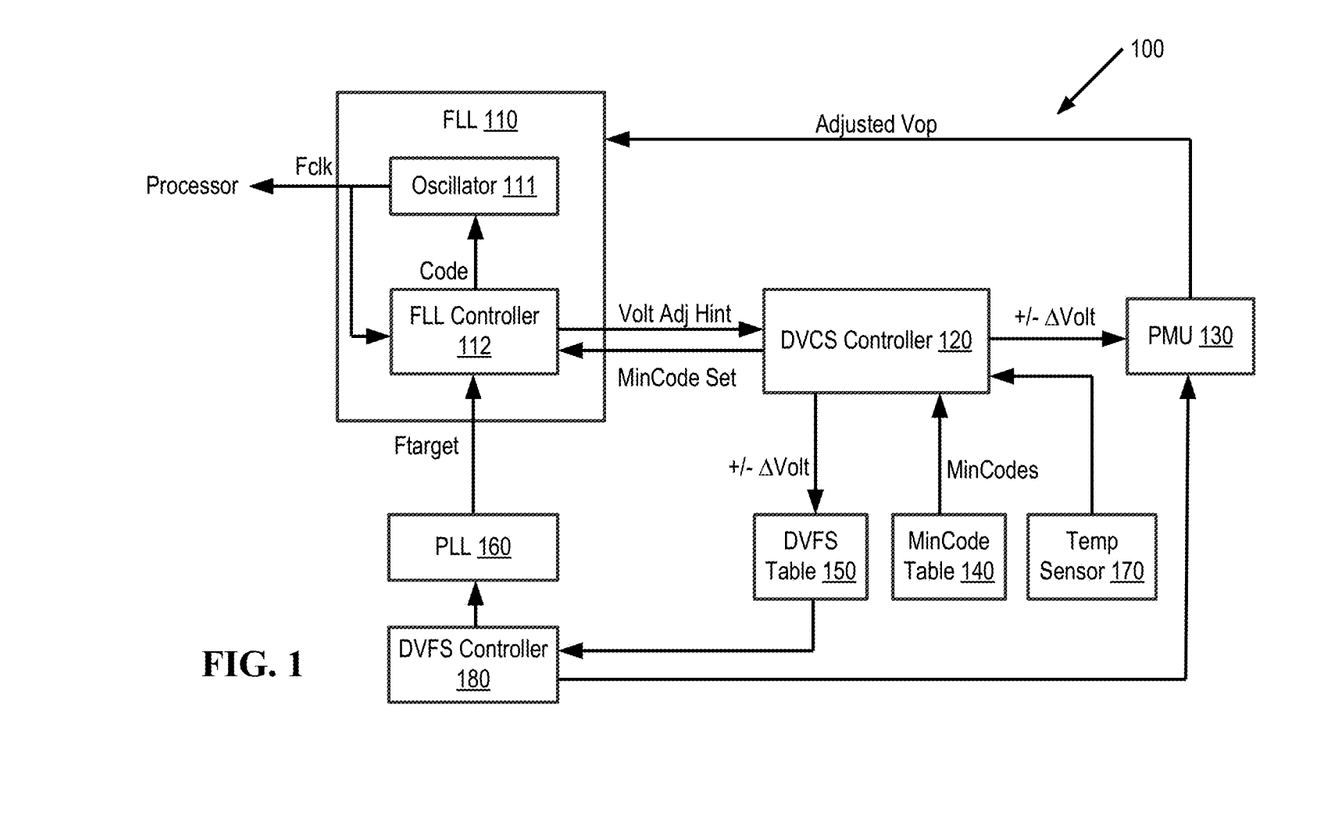
FIG. 1 is a block diagram illustrating an adaptive voltage scaling system according to one embodiment.

FIG. 1 is a block diagram illustrating an adaptive voltage scaling system 100 according to one embodiment. In this embodiment, system 100 includes an FLL 110, a DVCS controller 120, a power management unit (PMU) 130 (e.g., a power management integrated circuit (PMIC)), a first memory that stores a minimum code table 140, and a second memory that stores a DVFS table 150. System 100 further includes a phase-locked loop (PLL) 160 coupled to FLL 110. PLL 120 provides a target frequency (Ftarget) to FLL 110. FLL 110 includes an oscillator 111, such as a ring oscillator, which generates a clock signal at a clock frequency (Fclk). FLL 110 further includes an FLL controller 112, which outputs a code to oscillator 111 to control the clock frequency of oscillator 111. The code can be dynamically adjusted such that the clock frequency can closely track or match the target frequency. FLL controller 112 also generates a voltage adjustment hint indicating whether to increase, decrease, or maintain the present operating voltage to satisfy the system workload requirement at the target frequency. The voltage adjustment hint may be generated periodically (e.g., every one millisecond) to provide real time feedback on the voltage required to match the target frequency.

In one embodiment, the clock signal is provided to a processor such as a central processing unit (CPU), a microprocessor, a graphics processing unit (GPU), a digital processing unit (DSP), an AI processor, other general-purpose and/or special-purpose processing circuitry. The operating voltage is also provided to the processor that receives the clock signal. In one embodiment, system 100 and the processor receiving the clock signal may be part of a system-on-a-chip (SoC).

In one embodiment, DVCS controller 120 receives the voltage adjustment hint from FLL 110 and generates a voltage adjustment signal to indicate an adjustment to the present operating voltage. The adjustment may be to increase the present operating voltage by a step size (u) or to decrease the present operating voltage by the step size (u). DVCS controller 120 sends the voltage adjustment signal to PMU 130, and PMU 130 in response adjusts the operating voltage of FLL 110 accordingly.

Furthermore, based on the voltage adjustment hint from FLL 110, DVCS controller 120 determines an adjusted operating voltage (adjusted Vop) and identifies a Mincode set from minimum code table 140. When the adjusted operating voltage is not provided in minimum code table 140, the MinCode set (also referred to as a minimum code set) may be obtained by interpolating the given code values in minimum code table 140, where the given code values correspond to the adjusted Vop and the operating temperature sensed by a temperature sensor 170. DVCS controller 120 sends the MinCode set to FLL 110, such that FLL controller 112 can determine a code to configure oscillator 111 in real time. With the adjusted operating voltage and the code, oscillator 111 is configured to generate a clock signal that locks the target frequency (i.e., frequency and phase aligned to the target frequency). If the clock signal cannot lock the target frequency due to low operating voltage, FLL controller 112 can generate a hint to DVCS controller 120 to request a voltage increase. DVCS controller 120 in response requests PMU 130 for a voltage increase and updates the MinCode set corresponding to the increased voltage for FLL 110. In one embodiment, the update to the MinCode set can occur at a predetermined time interval; e.g., every one millisecond.

Additionally, when the operating voltage is adjusted, DVCS controller 120 can further update DVFS table 150 to indicate that the adjusted operating voltage corresponds to the present clock frequency. This update provides a real time view into the relationship between the clock frequency and the required voltage. DVFS table 150 may be used by a DVFS controller 180 to look up a corresponding voltage when there is a need to change the target frequency (e.g., for system performance). In one embodiment, the update to DVFS table 150 can occur at a predetermined time interval; e.g., every one millisecond.

Figure 2:
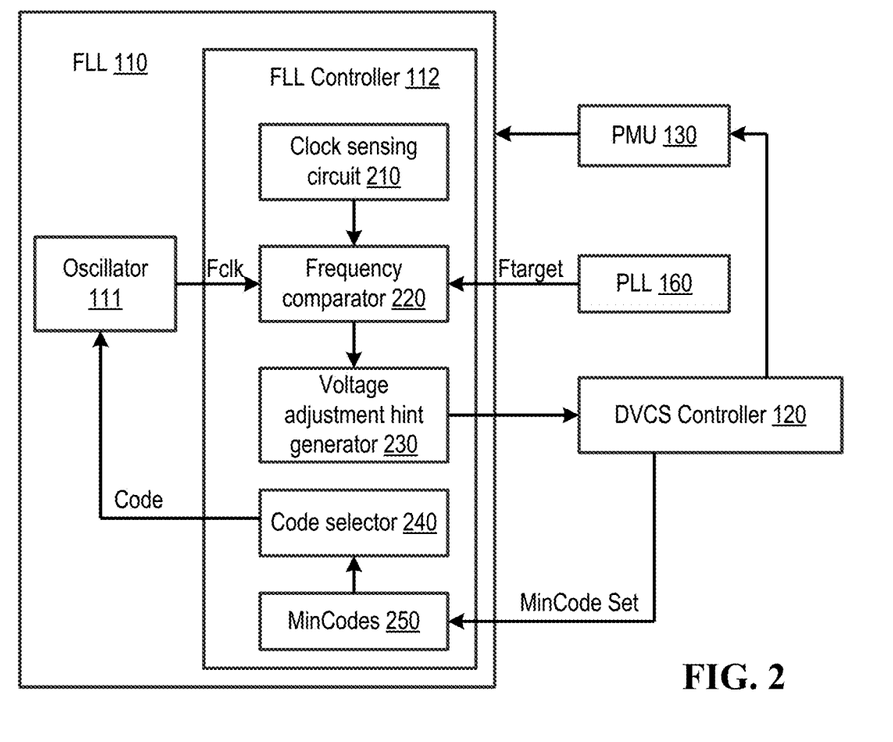
FIG. 2 is a block diagram illustrating an example of a frequency-locked loop (FLL) according to one embodiment.

FIG. 2 is a block diagram illustrating an example of an FLL (e.g., FLL 110 in FIG. 1) according to one embodiment. In this embodiment, FLL 110 includes oscillator 111 coupled to FLL controller 112. FLL 110 is coupled to PMU 130, which supplies an operating voltage to FLL 110. FLL 110 is further coupled to PLL 160, which provides a target frequency to FLL 110. FLL controller 112 provides a code C to oscillator 111, where code C is a set of parameters that can be used to configure oscillator 111 to generate a clock signal at a clock frequency (Fclk). FLL controller 112 may select or determine the value of code C and/or may request an adjustment to the operating voltage such that the clock frequency (Fclk) can match the target frequency (Ftarget). In one embodiment, FLL controller 112 includes a clock sensing circuit 210, a frequency comparator 220, a voltage adjustment hint generator 230, and a code selector 240. FLL controller 112 further includes a memory to store a set of MinCodes 250.

In one embodiment, clock sensing circuit 210 senses a time window for frequency comparison, and frequency comparator 220 compares the clock frequency (Fclk) with the target frequency (Ftarget). Depending on the difference between Fclk and Ftarget, FLL controller 112 may determine to request an adjustment to the operating voltage, and send the request for voltage adjustment to DVCS controller 120. Alternatively, FLL controller 112 may select a different code C from the set of MinCodes 250.

Figure 3:
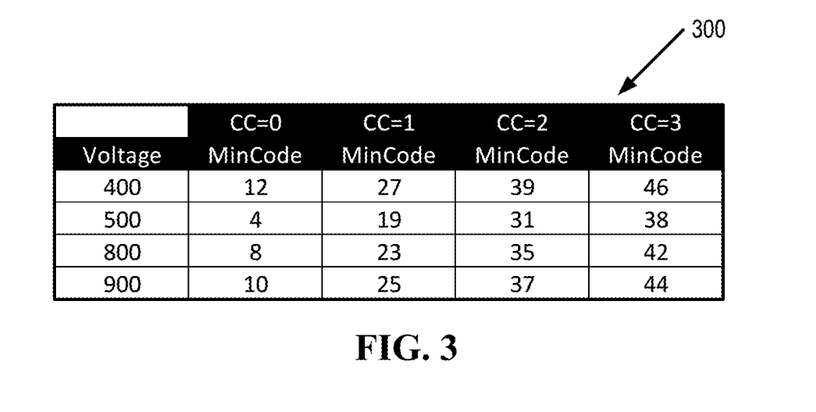
FIG. 3 illustrates an example of a minimum code table according to one embodiment.

FIG. 3 illustrates an example of a minimum code table 300 used by DVCS controller 120 (FIG. 1) according to one embodiment. Minimum code table 300 is an example of minimum code table 140 in FIG. 1. The values in minimum code table 300 may be determined during the chip testing stage. DVCS controller 120 may use minimum code table 300 to determine a MinCode set corresponding to the current operating voltage, and provide the MinCode set to FLL 110.

After DVCS controller 120 provides the MinCode set to FLL 110, code selector 240 in FLL 110 can select a code C=(CC, FC) to set the operating parameters of oscillator 111 to thereby adjust the clock frequency of oscillator 111.

In one embodiment, a MinCode includes a pair of a coarse code (CC) and a fine code (FC). Each MinCode set for a given voltage includes multiple FCs for the corresponding CCs. For example, according to table 300, the MinCode set for 400 mv includes (CC, FC)=(0, 12), (1, 27), (2, 39), (4, 46). Alternatively, the MinCode set for 400 mv may be represented by fine codes only; e.g., (12, 27, 39, 46), where each fine code corresponds to a respective coarse code. This MinCode set corresponds to a frequency range at 400 mv; a processor cannot safely operate at a clock frequency higher than this frequency range at 400 mv. The four coarse codes, which have fixed values of 0, 1, 2, 3, correspond to four frequency segments in the frequency range. The smaller the coarse code, the higher the frequency. The fine code can be used to fine tune the clock frequency in each frequency segment. FLL controller 112 may select a code that corresponds to the target frequency. It is understood that the values provided in table 300 are illustrative and non-limiting.

When a given operating frequency is not provided in minimum code table 300, DVCS controller 120 may interpolate the fine codes between two adjacent voltages in minimum code table 300. For example, if the operating voltage is 600 mv, DVCS controller 120 may interpolate the fine codes at 500 mv and 800 mv to obtain the fine codes at 600 mv. These fine codes and the corresponding coarse codes form the MinCode set at 600 mv.

In one embodiment, when the operating temperature is outside a predetermined temperature range, a code margin can be added to each fine code. The code margin may be determined during the chip testing process. The code margin can be adjusted according to the operating temperature measured by temperature sensor 170 (FIG. 1) and the operating voltage. The code margin provides temperature compensation to each fine code.

In an alternative embodiment, a minimum code table may be a three-dimensional table including a coarse code dimension, a voltage dimension, and a temperature dimension. The code values provided in the table are the fine codes. Thus, a fine code can be determined with a given coarse code, an operating voltage, and an operating temperature.

Figure 4:
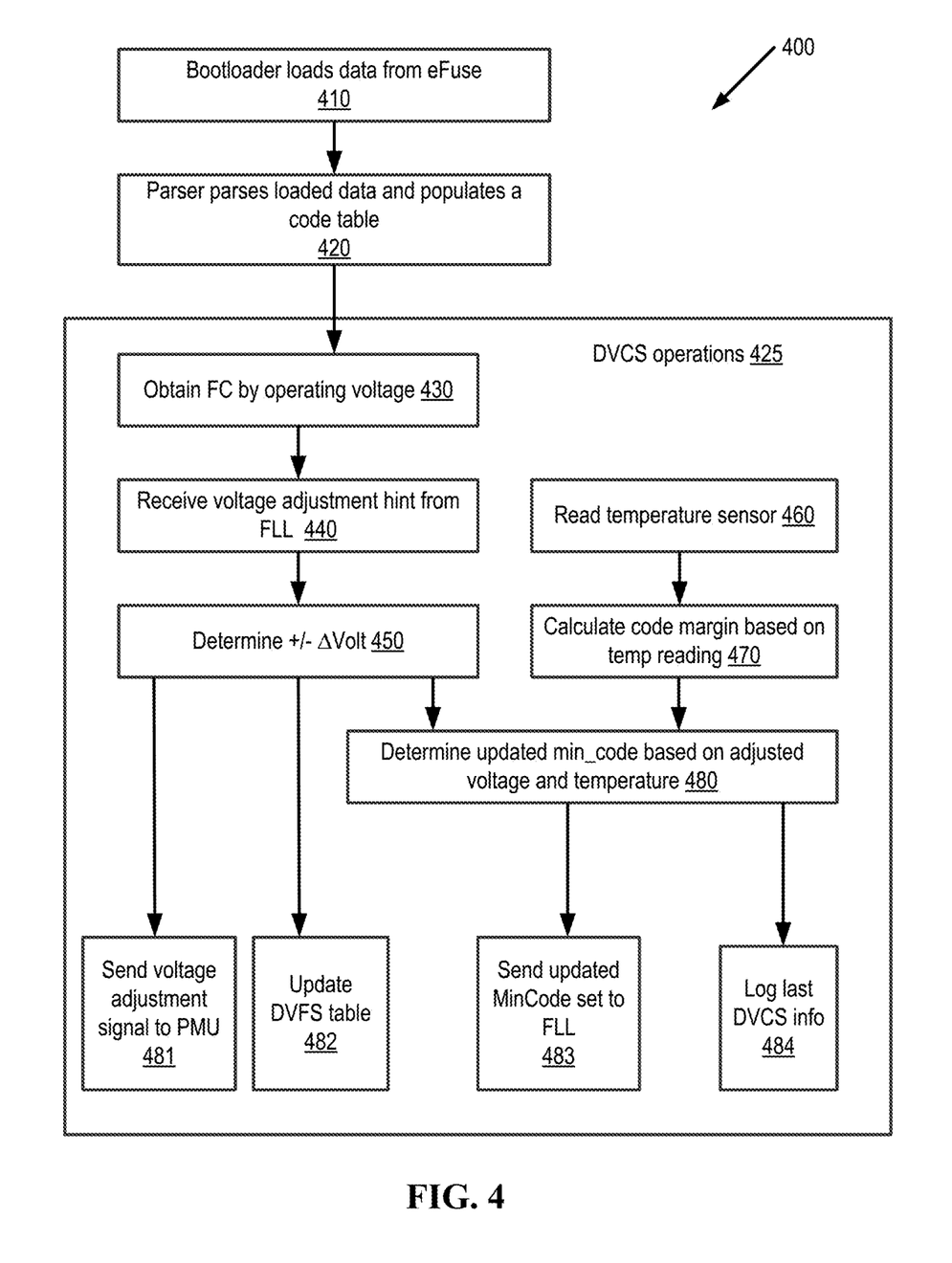
FIG. 4 is a diagram illustrating a dynamic voltage and code scaling (DVCS) process according to one embodiment.

FIG. 4 is a diagram illustrating a DVCS process 400 according to one embodiment. Process 400 starts with step 410 when a bootloader at system boot time initializes hardware and loads system data and software from on-chip memory, such as an eFuse. The loaded data contains voltage and code data to be used for adaptive voltage scaling. Alternatively, the voltage and code data may be read from embedded software stored in a location different from the eFuse.

Referring also to FIG. 1, at step 420, a parser parses the loaded data to format the data for DVCS controller 120 to read and populate a minimum code table, such as MinCode table 140 and/or MinCode table 300 in FIG. 3. At step 430, DVCS controller 120 obtains (e.g., by interpolation) fine codes for the present operating voltage. At step 440, DVCS controller 120 receives a voltage adjustment hint from FLL 110. The voltage adjustment hint may indicate whether to increase, decrease, or maintain the present operating voltage. At step 450, DVCS controller 120 generates a voltage adjustment signal according to the voltage adjustment hint. In one embodiment, the voltage adjustment may be a voltage increase by a step size u (where u is a positive real number), a voltage decrease by u, or an unchanged voltage. The voltage adjustment applied to the present operating voltage is the adjusted operating voltage (adjusted Vop).

Concurrent with the voltage adjustment determination, DVCS controller 120 further determines a MinCode adjustment for FLL 110. The MinCode adjustment may be based on the adjusted Vop and a temperature measurement that DVCS controller 120 receives from a temperature sensor at step 460. At step 470, DVCS controller 120 calculates or determines a code margin based on the temperature measurement. At step 480, DVCS controller 120 determines an updated MinCode set based on the adjusted Vop and the temperature measurement. DVCS controller 120 may interpolate the data in the MinCode table in the voltage dimension and/or the temperature dimension to obtain the updated MinCode set corresponding to the adjusted operating voltage.

At step 481, DVCS controller 120 sends a voltage adjustment signal to PMU 130. Upon receiving the voltage adjustment signal, PMU 130 supplies the adjusted Vop to FLL 110. DVCS controller 120 at step 482 updates a DVFS table to indicate that the adjusted operating voltage corresponds to the clock frequency. DVCS controller 120 at step 483 sends the updated MinCode set to FLL 110. FLL controller 112 may select a code C=(CC, FC) from the updated MinCode set to fine tune the clock frequency of oscillator 111. FLL controller 112 at step 484 logs the last DVCS information, such as the adjusted Vop, the clock frequency, and the updated MinCode set.

In one embodiment, DVCS operations 425 including steps 430-484 may repeat every N millisecond; e.g., every one millisecond. Thus, the operating voltage and the operating frequency can closely track any changes in the physical characteristics of the hardware and system workload.

Referring to FIG. 1, in some scenarios, DVFS controller 180 may determine to change the operating frequency to satisfy system performance requirements. DVFS controller 180 may use DVFS table 150 to determine an operating voltage corresponding to the changed operating frequency. DVFS controller 180 then sets PLL 160 to the changed operating frequency and requests PMU 130 to supply the corresponding operating voltage to the hardware including FLL 110 and the processor receiving the clock signal.

Figure 5:
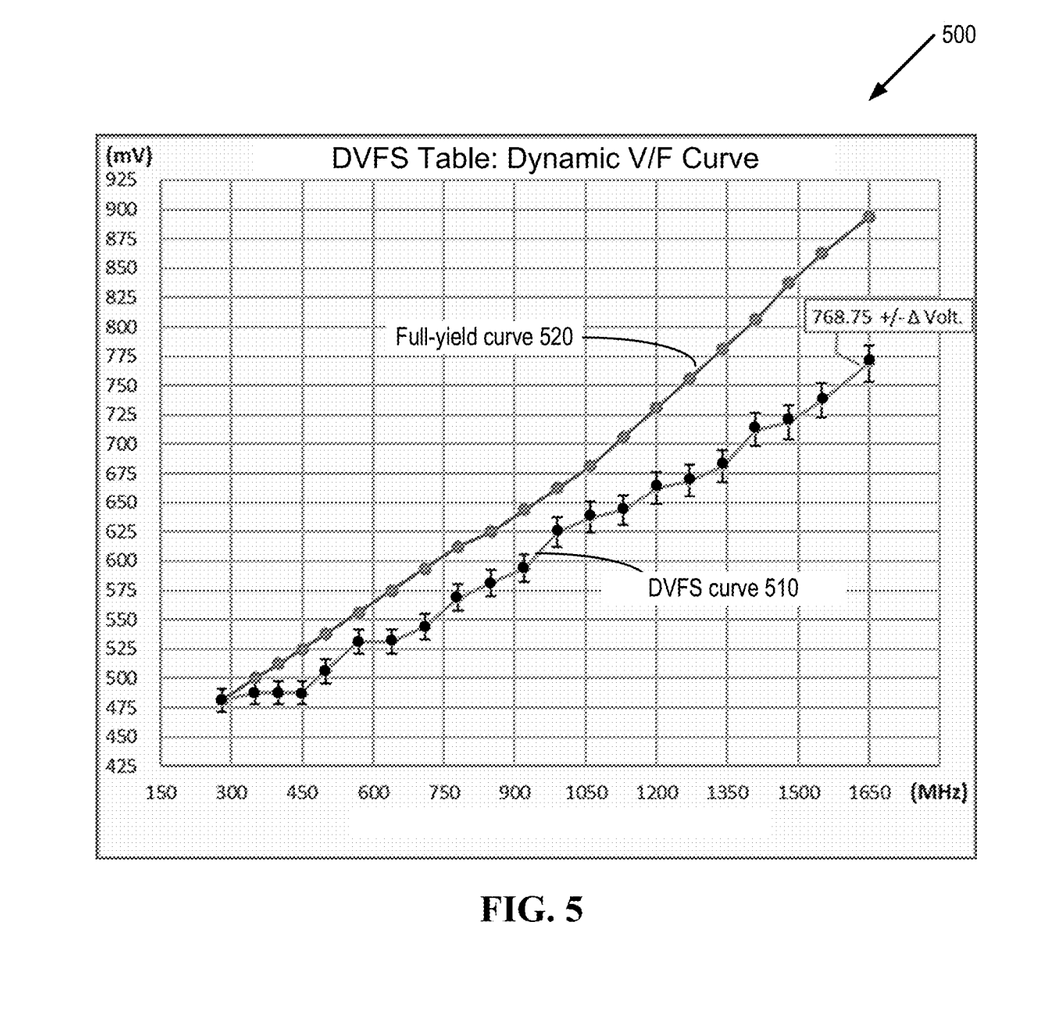
FIG. 5 is a diagram illustrating a dynamic voltage and frequency scaling (DVFS) table according to one embodiment.

FIG. 5 is an example of a DVFS table according to one embodiment. In this example, the voltage-frequency data in the DVFS table is represented by a DVFS curve 510. FIG. 5 also shows a full-yield curve 520 for comparison purposes. Each voltage point on full-yield curve 520 is padded with margins that incorporate the effects of all of the factors that demand power. Furthermore, full-yield curve 520 is not dynamically updated. Thus, for any given frequency, full-yield curve 520 requires an operating voltage that is much higher than the voltage needed to sustain a normal system workload in a normal operating condition. A conventional DVFS controller may use full-yield curve 520 in determining voltage scaling. By contrast, for each given frequency, DVFS curve 520 indicates a lower voltage value than full-yield curve 510, and, therefore, voltage scaling according to DVFS curve 520 can achieve power saving. DVCS operations, as described with reference to FIG. 1 and FIG. 4, suppress the voltage required by full-yield curve 510 to achieve power saving. The voltage points on DVFS curve 520 are dynamically updated in response to the voltage adjustment signal from DVCS controller 120. The vertical line segment on each voltage point of DVFS curve indicates a dynamic voltage range for a corresponding frequency.

Figure 6:
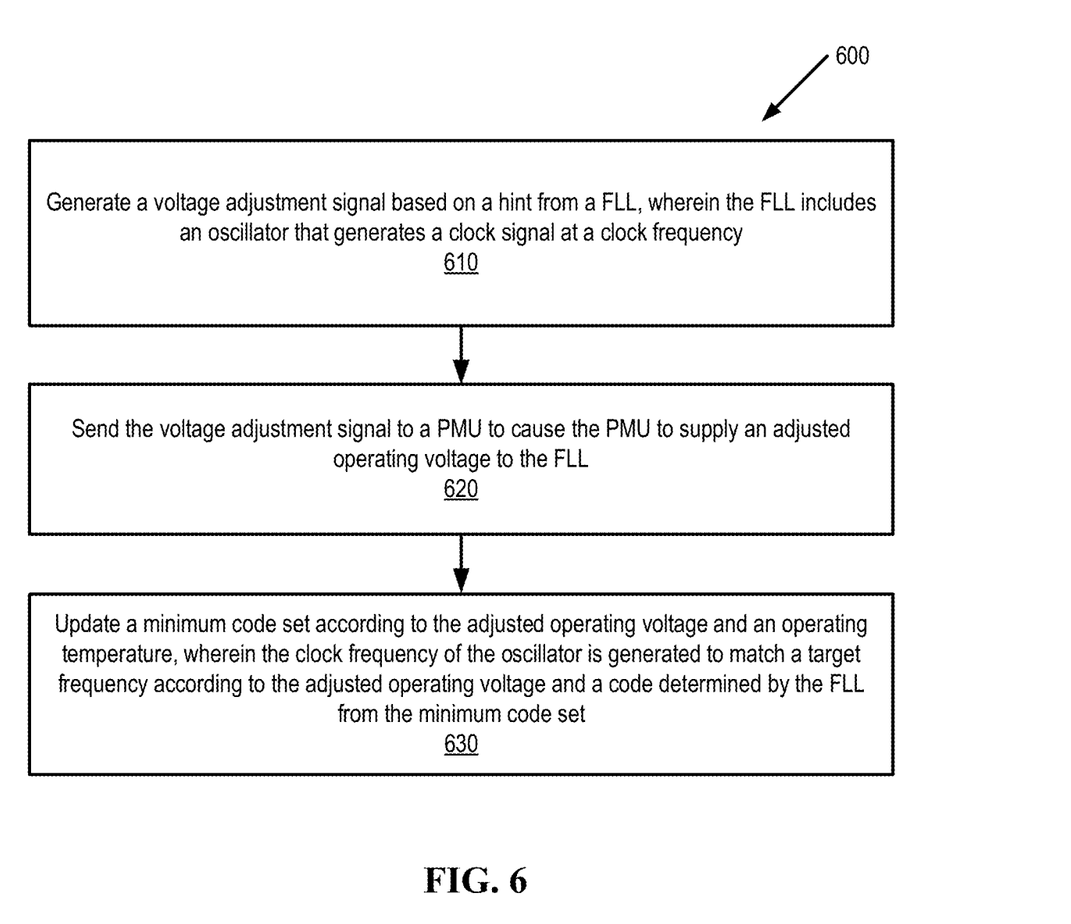
FIG. 6 is a flow diagram illustrating a method for adaptive voltage scaling according to one embodiment.

FIG. 6 is a flow diagram illustrating a method 600 for adaptive voltage scaling according to one embodiment. In one embodiment, method 600 may be performed by a circuit implementing DVCS controller 120 in FIG. 1. In one embodiment, the circuit may execute software to perform the operations of DVCS controller 120.

Method 600 starts with step 610 in which a DVCS controller generates a voltage adjustment signal based on a hint from a FLL (e.g., FLL 110 in FIG. 1). The FLL includes an oscillator that generates a clock signal at a clock frequency. At step 620, the DVCS controller sends the voltage adjustment signal to a PMU to cause the PMU to supply an adjusted operating voltage to the FLL. At step 630, the DVCS controller updates a minimum code set according to the adjusted operating voltage and an operating temperature. The clock frequency of the oscillator is generated to match a target frequency according to the adjusted operating voltage and a code determined by the FLL from the minimum code set.

In one embodiment, the voltage adjustment signal indicates an increase by a step size or a decrease by the step size in a present operating voltage of the FLL. The voltage adjustment signal may be generated at a predetermined time interval for the PMU to periodically adjust voltage supplied to the FLL.

In one embodiment, method 600 further includes the step of updating a dynamic voltage-frequency table to indicate that the adjusted operating voltage corresponds to the clock frequency. The dynamic voltage-frequency table may be updated at a predetermined time interval during operation of the FLL.

In one embodiment, the minimum code set is updated at a predetermined time interval during operation of the FLL. In one embodiment, updating the minimum code set further comprises identifying, from a minimum code table, first fine codes at a first voltage level above the adjusted operating voltage and second fine codes at a second voltage level below the adjusted operating voltage, and obtaining fine codes in the minimum code set at the adjusted operating voltage by interpolating between the first fine codes and the second fine codes.

In one embodiment, the minimum code set includes multiple fine codes and corresponding coarse codes. Method 600 further includes the step of determining a fine code in the minimum code set based on the adjusted operating voltage, an operating temperature, and a corresponding coarse code.

In one embodiment, the minimum code set includes multiple fine codes. Method 600 further includes the step of calculating a code margin based on an operating temperature, and adding the code margin to the fine codes that correspond to the adjusted operating voltage. The code provided to the oscillator may be dynamically adjusted to control the clock frequency at the adjusted operating voltage.

The operations of the flow diagrams of FIG. 4 and FIG. 6 have been described with reference to the exemplary embodiments of FIG. 1 and FIG. 2. However, it should be understood that the operations of the flow diagrams of FIG. 4 and FIG. 6 can be performed by embodiments of the invention other than the embodiments of FIG. 1 and FIG. 2, and the embodiments of FIG. 1 and FIG. 2 can perform operations different than those discussed with reference to the flow diagrams. While the flow diagrams of FIG. 4 and FIG. 6 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for adaptive voltage scaling, comprising:
generating a voltage adjustment signal based on a hint from a frequency-locked loop (FLL), wherein the FLL includes an oscillator that generates a clock signal at a clock frequency;
sending the voltage adjustment signal to a power management unit (PMU) to cause the PMU to supply an adjusted operating voltage to the FLL;
obtaining a minimum code set from a minimum code table according to the adjusted operating voltage and an operating temperature; and
determining a code by the FLL from the minimum code set, wherein the clock frequency of the oscillator is generated to match a target frequency according to the code and the adjusted operating voltage, and wherein obtaining the minimum code set further comprises:
identifying, from the minimum code table, first fine codes at a first voltage level above the adjusted operating voltage and second fine codes at a second voltage level below the adjusted operating voltage; and
obtaining fine codes in the minimum code set at the adjusted operating voltage by interpolating between the first fine codes and the second fine codes.

2. The method of claim 1, wherein the voltage adjustment signal indicates an increase by a step size or a decrease by the step size in a present operating voltage of the FLL.

3. The method of claim 1, wherein the voltage adjustment signal is generated at a predetermined time interval for the PMU to periodically adjust voltage supplied to the FLL.

4. The method of claim 1, further comprising:
updating a dynamic voltage-frequency table to indicate that the adjusted operating voltage corresponds to the clock frequency.

5. The method of claim 4, wherein the dynamic voltage-frequency table is updated at a predetermined time interval during operation of the FLL.

6. The method of claim 1, wherein the minimum code set is updated at a predetermined time interval during operation of the FLL.

7. The method of claim 1, wherein the minimum code set includes a plurality of fine codes and corresponding coarse codes, the method further comprises:
determining a fine code in the minimum code set based on the adjusted operating voltage, an operating temperature, and a corresponding coarse code.

8. The method of claim 1, wherein the minimum code set includes a plurality of fine codes, the method further comprises:

calculating a code margin based on an operating temperature; and adding the code margin to the fine codes that correspond to the adjusted operating voltage.

9. The method of claim 1, further comprising:

dynamically adjusting the code provided to the oscillator to control the clock frequency at the adjusted operating voltage.

10. A system operative to perform adaptive voltage scaling, comprising:

a frequency-locked loop (FLL) circuit including an oscillator, the oscillator operative to generate a clock signal at a clock frequency; and a circuit operative to control dynamic voltage and code scaling (DVCS), the circuit is further operative to:

generate a voltage adjustment signal based on a hint from the FLL;

send the voltage adjustment signal to a power management unit (PMU) to cause the PMU to supply an adjusted operating voltage to the FLL;

obtain a minimum code set from a minimum code table according to the adjusted operating voltage and an operating temperature; and determine a code by the FLL from the minimum code set, wherein the clock frequency of the oscillator is generated to match a target frequency according to the code and the adjusted operating voltage, and wherein when obtaining the minimum code set, the circuit is further operative to:

identify, from the minimum code table, first fine codes at a first voltage level above the adjusted operating voltage and second fine codes at a second voltage level below the adjusted operating voltage; and obtain fine codes in the minimum code set at the adjusted operating voltage by interpolating between the first fine codes and the second fine codes.

11. The system of claim 10, wherein the voltage adjustment signal indicates an increase by a step size or a decrease by the step size in a present operating voltage of the FLL.

12. The system of claim 10, wherein the voltage adjustment signal is generated at a predetermined time interval for the PMU to periodically adjust voltage supplied to the FLL.

13. The system of claim 10, wherein the circuit is further operative to:

update a dynamic voltage-frequency table to indicate that the adjusted operating voltage corresponds to the clock frequency.

14. The system of claim 13, wherein the dynamic voltage-frequency table is updated at a predetermined time interval during operation of the FLL.

15. The system of claim 10, wherein the minimum code set is updated at a predetermined time interval during operation of the FLL.

16. The system of claim 10, wherein the minimum code set includes a plurality of fine codes and corresponding coarse codes, the circuit is further operative to:

determine a fine code in the minimum code set based on the adjusted operating voltage, an operating temperature, and a corresponding coarse code.

17. The system of claim 10, wherein the minimum code set includes a plurality of fine codes, the circuit is further operative to:

calculate a code margin based on an operating temperature; and add the code margin to the fine codes that correspond to the adjusted operating voltage.

18. The system of claim 10, wherein the circuit is further operative to:

dynamically adjust the code provided to the oscillator to control the clock frequency at the adjusted operating voltage.

* * * * *